UNITED STATES PATENT OFFICE.

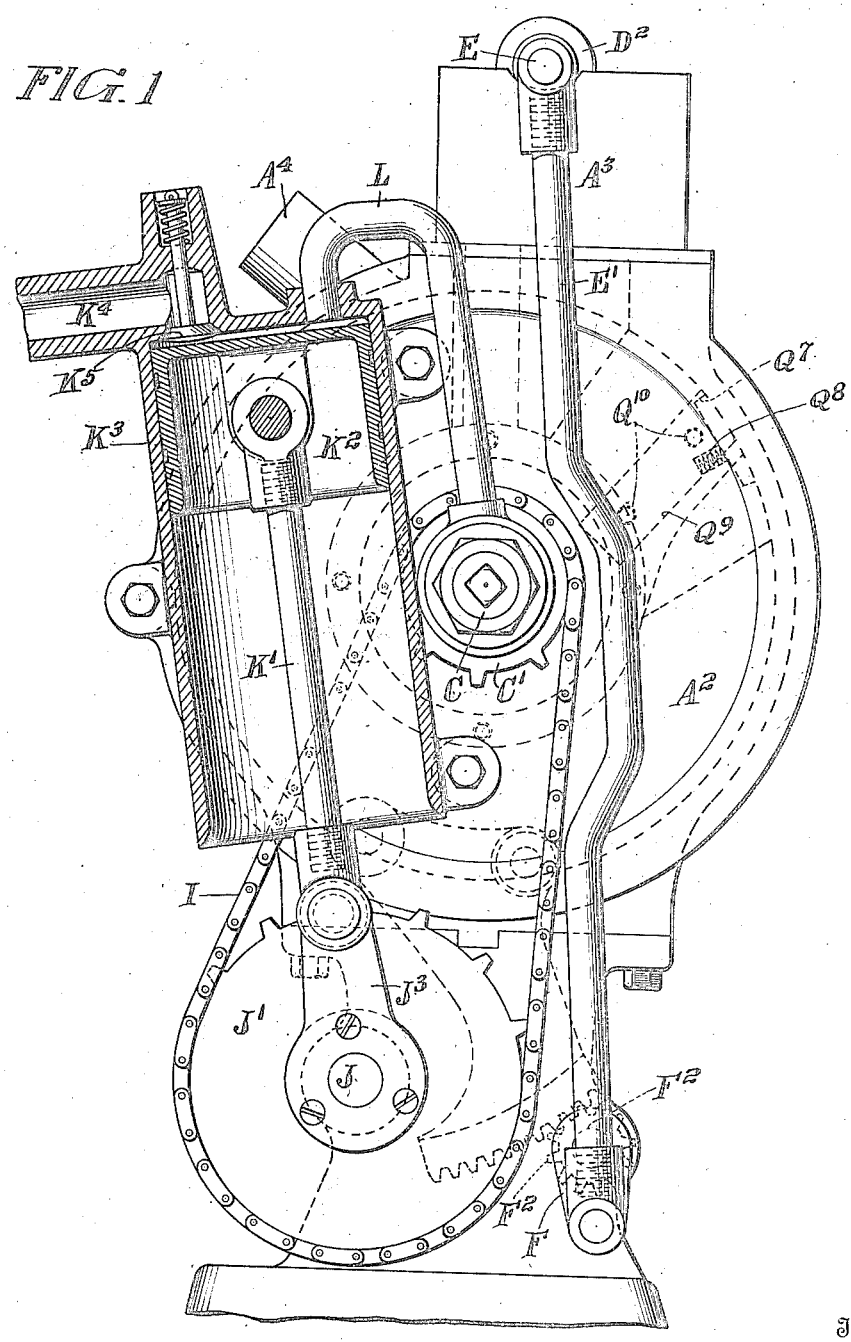

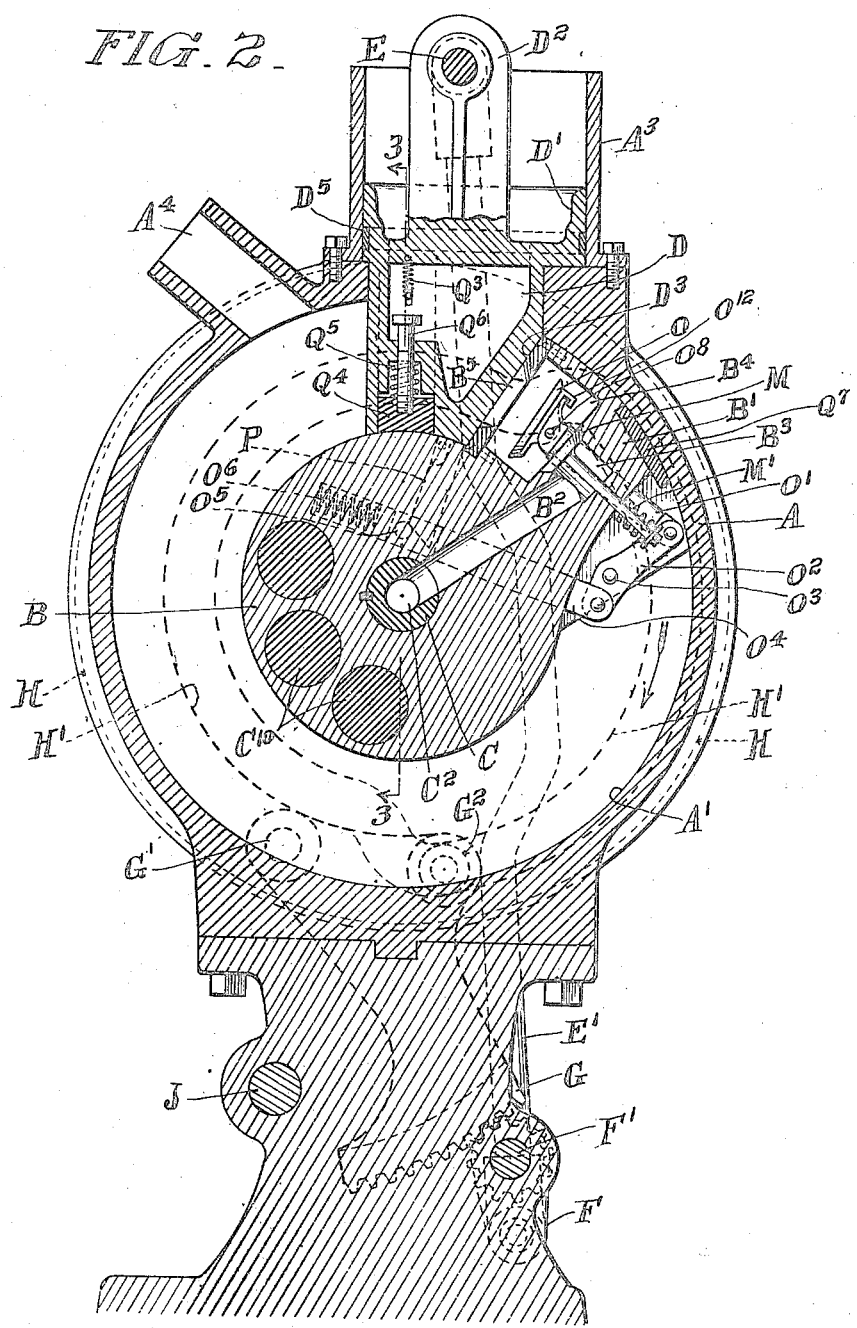

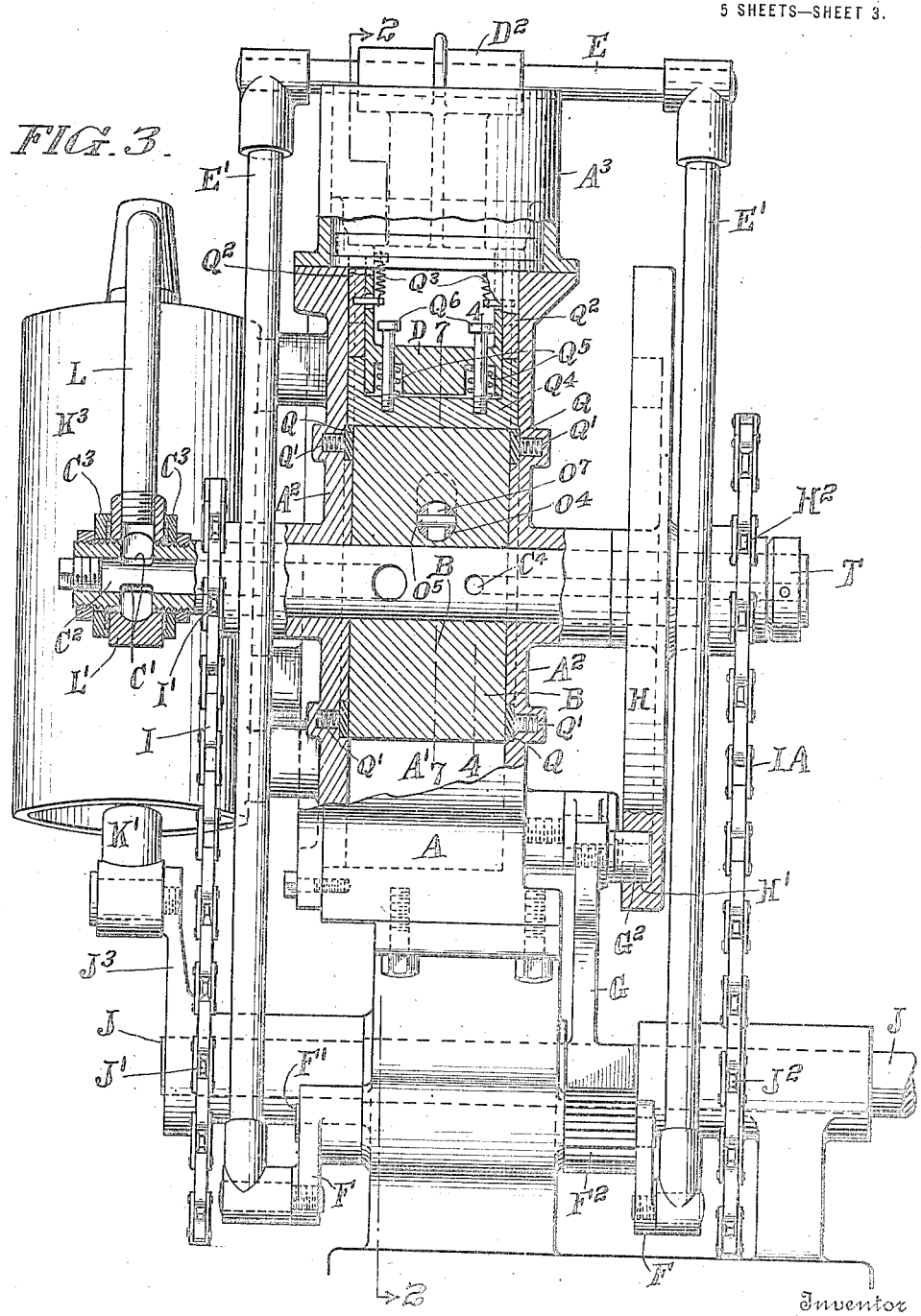

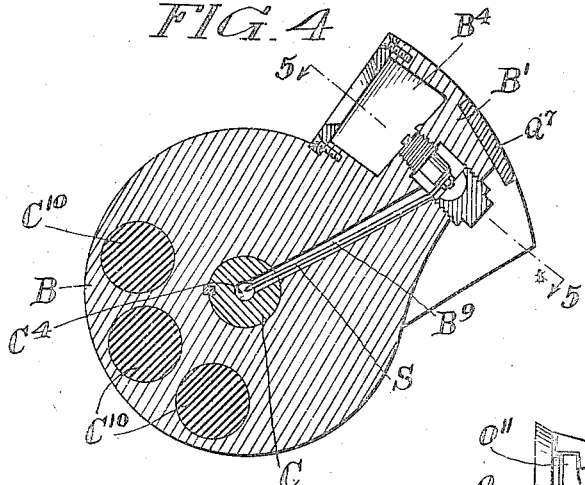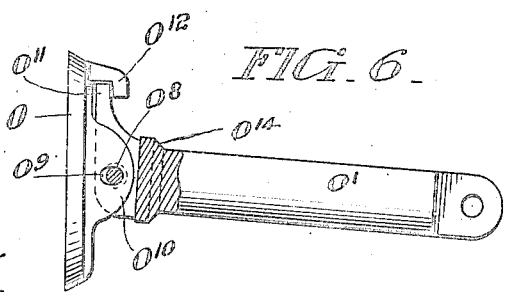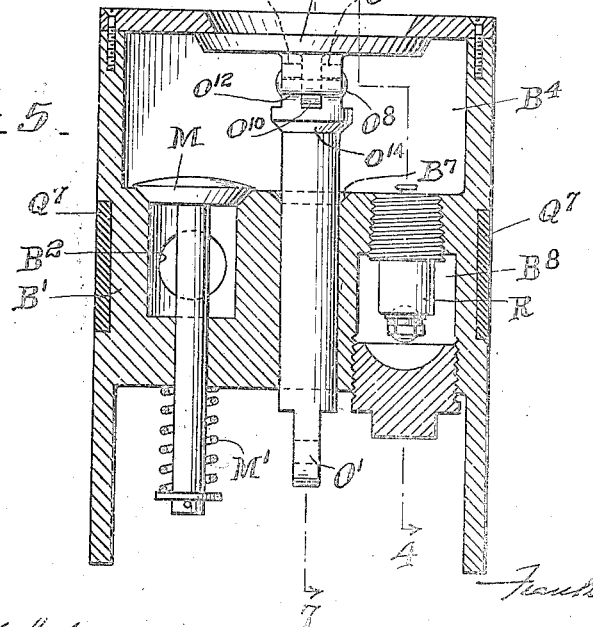

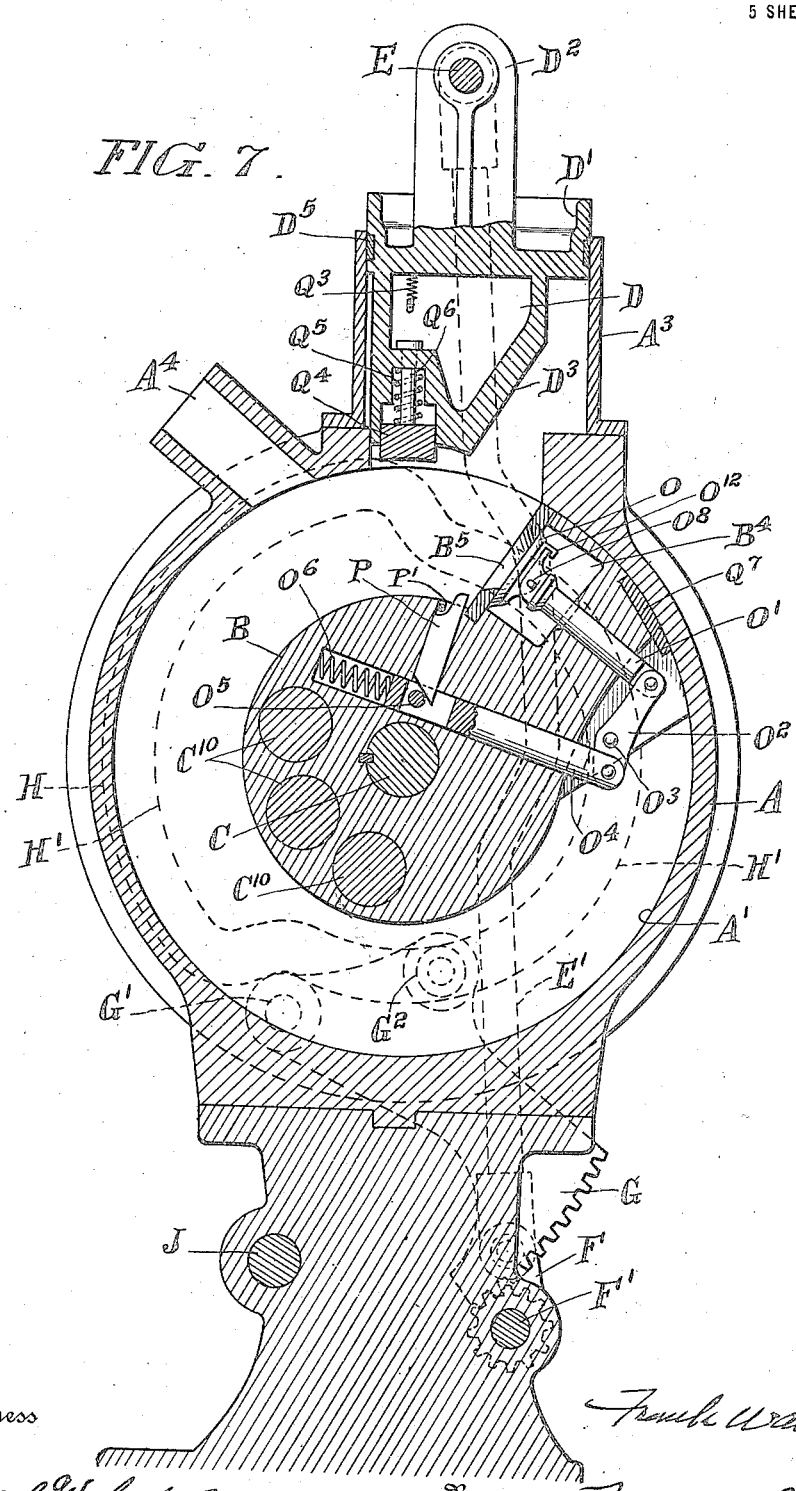

FRANK WALTER, OF PHILADELPHIA, PENNSYLVANIA, ASSIGNOR TO ENOS F. SCHLICHTER, OF PHILADELPHIA, PENNSYLVANIA.

ROTARY INTERNAL-COMBUSTION ENGINE.

1,239,853.     Specification of Letters Patent.     Patented Sept. 11, 1917.

Application filed July 29, 1916. Serial No. 111,970.

*To all whom it may concern:*

Be it known that I, FRANK WALTER, a citizen of the United States, and resident of the city and county of Philadelphia and State of Pennsylvania, have invented a certain new and useful Improvement in Rotary Internal-Combustion Engines, of which the following is a true and exact description, reference being had to the accompanying drawings, which form a part thereof.

My present invention relates to internal combustion engines of the rotary piston type, and has for its general object to provide an improved engine of this type. A more specific object of my invention is to provide such an engine with simple and effective means for precompressing each fuel charge and delivering it to the combustion chamber in such manner as to minimize the waste clearance space, and to obviate or minimize leakage without subjecting the engine to an undue frictional load.

Another specific object of my invention is to provide a rotary piston internal combustion engine with exhaust means of such character as to give a prolonged period of exhaust following each explosion in the engine cylinder, without appreciable reduction in the power output of the engine due to the slow exhaust.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is an end elevation of an engine embodying my invention with the precompressing cylinder and piston of the engine shown in section;

Fig. 2 is a sectional elevation, the section being taken on the line 2—2 of Fig. 3;

Fig. 3 is an elevation taken at right angles to Fig. 1 and partly in section on the line 3—3 of Fig. 2;

Fig. 4 is a section through the piston on the line 4—4 of Figs. 3 and 5;

Fig. 5 is a section through the piston taken on the line 5—5 of Fig. 4;

Fig. 6 is an elevation of one of the valves employed; and

Fig. 7 is a section taken similarly to Fig. 2 showing the parts in a different position.

In the particular engine construction shown in the drawings, A represents the engine casing or body, and A' the cylindrical piston chamber therein receiving the rotating piston B. The latter is carried by a shaft C journaled in the end walls $A^2$ of the chamber A'. The piston B comprises a cylindrical body portion coaxial with the chamber A', and a projection B' from the periphery of said body portion. The outer end surface of the projection B' extends into engagement with the cylindrical outer wall of the chamber A'. D represents a sliding abutment having a concave inner end which normally bears against the peripheral surface of the body of the piston B. At its outer end the abutment D, which passes through an opening formed in the peripheral wall proper, of the cylinder A, is provided with a piston like extension D' working in a cylinder $A^3$ secured to and forming a part of the engine casing. Secured to the outer side of the piston D' is a bracket or post $D^2$ in which is journaled a shaft or crosshead member E which is connected at its ends to the upper ends of connecting rods E'. The latter are connected at their lower ends to cranks F carried by a rock shaft F' journaled in the engine frame work. The rock shaft F' carries a spur gear $F^2$ which is in mesh with a gear segment G journaled on the stud G' carried by the engine frame work and provided with a cam roll $G^2$ entering the cam-way H' formed in the cam disk H loosely journaled on the shaft C.

The shaft C has secured to it a sprocket wheel C' which, through sprocket chains I passing over the gear wheel C' and the gear wheel J' carried by a crank shaft J, rotates the latter at half the angular velocity of the main engine shaft C. The cam disk H has secured to it a sprocket wheel $H^2$ connected by the chain $H^2$ to the wheel $J^2$ secured to the shaft J. The sprocket wheels $H^2$ and $J^2$ are of the same size and the cam disk H therefore rotates with the same velocity as the half time shaft J. The crank shaft J carries a crank arm $J^3$ which is connected by the piston rod K' with the charge compressing piston K² working in the cylinder K³. The fuel charge is drawn as from a suitable carbureter (not shown) into the upper end of the cylinder K³ through the supply passage K⁴ and past the non-return puppet valve K⁵. The compressed charge is forced from the cylinder K³ through the pipe L into and through a chambered member L′ which surrounds the shaft C and defines an annular chamber surrounding the shaft and communicating with the axial passage C² in the latter through the radial ports C′. Bearing plates C³ carried by the shaft C fit snugly against the opposite sides of the member L and prevent leakage through the joints between these plates and the member L′. The passage C′ in the shaft C communicates with a radial passage B² in the piston B which opens through a passage B³ in the piston portion B′ into a charge receiving chamber B⁴ formed in the piston part B′. The chamber B⁴ communicates through a port B⁵ in the removable plate forming the rear wall of the piston portion B′ into the chamber A′. Any back flow from the chamber B⁴ into the chamber B³, at the time of ignition of the charge is prevented by a check or non-return valve M which is normally held seated by the spring M′. The premature passage of the charge from the chamber B⁴ through the port B⁵ into the cylinder A′ is prevented by the valve O working in the chamber B⁴ and normally closing the port B⁵.

The valve O is moved away from its seat at the proper instant by operating connections which include a plunger O′ which projects through the front wall of the chamber B⁴ and has its inner end connected to the valve disk O and its outer end connected to one end of a lever O². The lever O² is pivotally connected to the piston at O³, and has its second end connected to an operating rod O⁴ which is mounted in a channel formed in the piston B. A spring O⁶ acting against the inner end of the plunger O⁴ normally holds the valve O against its seat. The plunger O⁴ is retracted, and the valve O thereby opened, by means of a radially movable plunger P mounted in the piston B, and provided with a beveled inner end adapted to engage a pin O⁵ traversing a slot O⁷ formed in the plunger O⁴ and into which the beveled inner end of the plunger P projects. Normally the reduced outer end of the plunger P projects beyond the periphery of the cylindrical body portion of the piston B to the extent permitted by the engagement of the plunger P with the stop pin P′ as shown in Fig. 7, but when the parts are in the position shown in Fig. 2, the outer end of the plunger P is engaged by the inner end of the abutment D and the plunger P thereby forced inward to open the valve C.

In the preferred construction illustrated the valve stem or plunger O′ is connected to the valve disk O by means of a pintle O⁸ mounted in the bifurcated end of the plunger O′. The pintle O⁸ passes through a slightly elongated passage O⁹ formed in the bracket ear O¹⁰ on the back of the valve disk O. The bifurcations of the plunger O′ terminate in toe or offset portions O¹¹ which take under hook like projections O¹² on the back of the valve disk O. The described connection between the valve disk O and plunger O′ permit the valve disk the slight necessary freedom of adjustment to insure its proper seating. In unseating the valve disk O, the initial movement of the latter is effected by the engagement of the toe portions with the hooks. This turns the valve disk about its lower edge and reduces the power required to unseat the valve disk O. The body of the plunger O′ fits snugly in the passage in the piston portion in which it is mounted. Advantageously the plunger O′ is formed with a shoulder O¹⁴ which forms a valve engaging the seat B⁷ (see Fig. 5) to prevent leakage out of the chamber B⁴ at the time the charge is ignited.

In the engine shown the ignition of the charge is started in the chamber B⁴ at the proper times by means of a spark plug R mounted in the chamber B⁸ formed in the piston portion B′. Within the chamber the spark plug is connected to an insulated electrical conductor which passes through the radial piston passage B⁹ and the passage C⁴ in the shaft C to a contact ring T mounted on one end of the shaft C. The mechanism which coöperates with the contact ring to operatively connect the latter in circuit and thus ignite the charge is not illustrated and need not be described as various forms of mechanism suitable for the purpose are well known.

Suitable provisions are made to prevent leakage between the stationary and movable parts of the engine. These provisions in the construction illustrated, comprise anti-leakage rings Q mounted in circular grooves formed in the side walls of the chamber A′ and forced inward against the ends of the body portion of the piston by springs Q′. The abutment D is provided with a channel in its inner face and communicating channels in its side walls to receive a U-shaped anti-leakage or wear member Q⁴. The yoke of the member Q⁴ has a cylindrical inner surface adapted to fit against the peripheral surface of the body portion of the piston B. Springs Q⁵ press the member Q⁴ against the body of the piston B and headed bolts Q⁶, or like devices, are employed to prevent excessive inward movement of the member Q⁴. The legs of the member Q⁴, which work in the channels formed partly in the side walls of the abutment D and partly in the engine casing A, are in tongue and groove engagement with bar like anti-friction parts $Q^2$. The latter are held by the springs $Q^3$ in a position in which they bear snugly against the inner edge of the piston ring $D^5$ mounted in the abutment D. An anti-leakage or wear plate $Q^7$ mounted in a socket formed in the outer end of the piston projection B', is pressed outward into engagement with the peripheral wall of the chamber A' by spring $Q^8$. The piston is also formed with channels in its end walls receiving bar like anti-leakage wear plates $Q^9$ which overlap the rings $Q^7$ and the wear plate $Q^7$ at their opposite ends and are pressed outward against the side walls of the chamber A' by springs $Q^{10}$.

The engine shown, is intended to receive and ignite a charge once every second piston revolution. The engine is shown in Figs. 1 and 2 in the condition in which ignition begins. In this condition the chamber $B^4$ is filled with the compressed charge and the valve O is off its seat. As the piston turns in the direction of the arrow shown in Fig. 2, the burning charge expends out of the chamber $B^4$ into the constantly increasing portion of the cylinder space A' lying between the end surface $D^3$ of the abutment D and the rear side of the piston projection B'. The abutment D remains in the position shown in Fig. 2 until the continued rotation of the piston brings the front end of the piston projection B' into close proximity with the abutment. When this occurs the passage of the cam roll $G^2$ from the outer dwell $h'$ of the cam groove H' of the cam disk H into the inner dwell $h^2$ of the cam, rocks the gear segment G and thereby the crank shaft F, and moves the abutment D into the position shown in Fig. 7. The cam dwell $h^2$ is of such length that the abutment D remains in the position shown in Fig. 7 while the piston B makes approximately one and a third revolutions. Throughout the period during which the abutment D is thus in its outer position all portions of the cylinder chamber A' are open to the open exhaust passage $A^4$, except momentarily when this passage is cut off by the travel of the piston projection B' past its inner end. The prolonged exhaust period thus provided makes it possible to obtain a relatively quiet exhaust without the use of special muffle provisions, and without any appreciable loss of power from the back pressure in the engine cylinder during the exhaust period since that pressure does not impede the rotation of the piston.

In the position shown in Fig. 2, the valve O is held in the open position through the engagement of the abutment D with the outer end of the valve actuating plunger P. A very slight initial movement of the piston away from the position shown in Fig. 2 is sufficient to free the outer end of the plunger P. The valve O does not immediately return to its closed position, however, owing to the differential pressure effect on the valve member O and plunger P of the pressures in the portions of the chamber A' separated by the piston projection B'. When the outward movement of the abutment D equalizes the pressure on the two sides of the piston projection B' the valve O seats. The chamber $B^4$ will be purged of the small amount of burnt gases remaining in it at the time the abutment D is moved outward by the slight amount of the compressed fuel charge remaining in the channels C', $B^2$ and chamber $B^4$, which is under sufficient pressure to lift the valve M and sweep out the chamber $B^4$ when the elevation of the abutment D lowers the pressure in the portion of the cylinder space A' back of the projection B'.

During the first revolution of the piston B following each charge ignition, the charge compressing piston $K^2$ fills the cylinder $K^3$ with the fuel mixture drawn from the carbureter through the passage $K^4$. During the second revolution of the piston B the compressing piston $K^2$ compresses the fuel charge and transfers it into the chamber $B^4$. As the second revolution of the piston following ignition nears completion the cam roll $G^3$ passes from the inner dwell $h'$ of the cam-way H' into the outer dwell $h^2$ thus returning the abutment D to the position shown in Fig. 2. The mechanism is so timed that the inclined face $D^3$ of the abutment may come down alongside the inner face of the piston projection B' so that as shown, there is no clearance space between the abutment D and the piston projection B' when the parts are in the position shown in Fig. 2 and ignition is about to occur. The inward movement of the abutment D must be so timed, of course, relative to the piston travel that the plunger P will not engage the anti-leakage member $Q^4$. The latter comes into contact with the cylindrical body of the piston B before the valve O is moved off its seat. The sparking mechanism (not shown) coöperating with the contact ring T energizes the spark plug R to ignite the fuel charge in the chamber $B^4$ on every alternate movement of the piston into the position shown in Fig. 2.

Either or both of the shafts C and J may be used as driving shafts. In practice, however, I contemplate using the shaft C as the power in most cases. The weight of the piston projection B' and parts mounted therein is balanced by lead bodies $C^{10}$, in the cavities provided for the purpose in the body of the piston.

Among the numerous important practical advantages of my invention are its comparative mechanical simplicity and ease of construction, the relatively high power and low speed which it is possible to obtain with an engine of given cylinder space, the efficient operation of the engine due to the manner in which the compressed fuel charge is supplied and ignited, and the prolonged and effective character of the exhaust, and the small liability to substantial injury of the working parts of the engine from the erosive action of the working fluid. It will also be apparent that certain features of my invention may sometimes be used to advantage without a corresponding use of other features.

Having now described my invention, what I claim as new and desire to secure by Letters Patent, is:—

1. In an internal combustion engine of the rotary piston type, the combination with the engine cylinder of a rotary piston working therein and formed with a charge receiving chamber, a valve carried by the piston and controlling communication between said chamber and the cylinder space in which the piston works and means for delivering fuel charges to, and igniting them in said chamber.

2. In an internal combustion engine of the rotary piston type, the combination with the engine cylinder of a rotary piston working therein and formed with a charge receiving chamber, a valve carried by the piston and controlling communication between said chamber and the cylinder chamber proper and means for intermittently delivering precompressed fuel charges to said chamber and for successively igniting said charges in said chamber.

3. In an internal combustion engine of the rotary piston type, the combination with the engine cylinder of a rotary piston working therein and comprising a cylindrical body portion and a projection from the periphery thereof and formed with a charge receiving chamber, an abutment movable into and out of the path of movement of said projection, and a valve mounted in said piston and actuated by said abutment for controlling communication between said chamber and cylinder.

4. In an internal combustion engine of the rotary piston type, the combination with a working cylinder of a rotary piston working in said cylinder and formed with a fuel charge receiving chamber, a valve carried by the piston and controlling communication between said chamber and the cylinder, and a spark plug mounted in said piston and adapted to ignite a fuel charge contained in said chamber.

5. In an internal combustion engine of the rotary piston type, the combination with the engine cylinder of a rotary piston working therein and comprising a cylindrical body portion, of smaller diameter than said cylinder, and a projection from said body portion extending into engagement with the peripheral wall of said cylinder, an abutment movable into and out of position in which it extends across the path of said piston projection, a half-time shaft and means actuated thereby for moving said abutment into and out of the path of said piston projection once during each two successive revolutions of the piston.

6. In an internal combustion engine of the rotary piston type, the combination with a working cylinder having a normally open exhaust port of a rotary piston working in said cylinder and provided with a cylindrical body portion of smaller diameter than said cylinder and a projection from said body portion extending into engagement with the peripheral wall of said cylinder, an abutment movable from an inner position in which it engages the body of said piston to an outer position in which it clears said piston projection, and actuating mechanism for said abutment adapted to alternately maintain the latter in its inner position while said piston makes a portion of one revolution and for maintaining it in its outer position while said piston makes more than one revolution.

7. In an internal combustion engine of the rotary piston type, the combination with the engine cylinder of a rotary piston working therein and formed with a charge receiving chamber, a valve and actuating means therefor carried by the piston and controlling communication between said chamber and said cylinder, and a fuel precompressing device external to said cylinder and actuated by said piston for delivering a fuel charge to said chamber at regular intervals in the operation of the engine.

8. In an internal combustion engine of the rotary piston type, the combination with the engine cylinder of a rotary piston working therein and formed with a charge receiving chamber and with an axial supply passage communicating with said chamber, a valve and actuating means therefor carried by the piston and controlling communication between said chamber and said cylinder, and a fuel precompressing device actuated by said piston for delivering a fuel charge to said chamber through said axial passage at regular intervals in the operation of the engine.

9. In an internal combustion engine of the rotary piston type, the combination with the engine cylinder of a rotary piston working therein and comprising a cylindrical body portion of smaller diameter than said cylinder and a projection from said body portion extending into engagement with the peripheral wall of said cylinder and formed with a charge receiving chamber opening to the cylinder through a port formed in the rear wall of said piston projection, a valve mechanism mounted in said piston for controlling said port, and an abutment movable inward into engagement with the body of said piston and outward to clear said piston projection, the adjacent faces of said abutment and said projection being inclined to the line of movement of the abutment.

10. In an internal combustion engine of the rotary piston type, the combination with the engine cylinder of a rotary piston working therein and comprising a cylindrical body portion of smaller diameter than said cylinder and a projection from said body portion extending into engagement with the peripheral wall of said cylinder and formed with a charge receiving chamber opening to the cylinder through a port formed in the rear wall of said piston projection, a valve mechanism mounted in said piston and controlling said port, an abutment movable inward into engagement with the body of said piston and outward to clear the path of said piston projection, said abutment comprising separately movable piston body engaging sections one of which, adjacent the rear side of the abutment engages the body of the piston before the other as said abutment moves inward.

11. In an internal combustion engine of the rotary piston type, the combination with a working cylinder, of a rotary piston working in said cylinder and provided with a cylindrical body portion of smaller diameter than said cylinder and a projection from said body portion extending into engagement with the peripheral wall of said cylinder and formed with a charge receiving chamber communicating with said cylinder through a port formed in the rear wall of said projection, a valve mechanism controlling said port and including an actuating device movably mounted in the piston and normally projecting from the periphery of the body portion of said piston, and an abutment movable from one position in which it extends across the path of said piston projection and engages said actuating member and opens said port to a second position in which it clears said path and permits the valve mechanism to close said port.

12. In an internal combustion engine of the rotary piston type, the combination with a working cylinder, of a rotary piston working in said cylinder and provided with a cylindrical body portion of smaller diameter than said cylinder and a projection from said body portion extending into engagement with the peripheral wall of said cylinder and formed with a charge receiving chamber communicating with said cylinder through a port formed in the rear wall of said projection, a valve mechanism controlling said port and including an actuating device movably mounted in the piston and normally projecting from the periphery of the body portion of said piston in close proximity to the rear face of said projection, and an abutment movable in timed relation with the piston movements from one position in which it extends across the path of said piston projection to a second position in which it clears said path, said abutment comprising a front edge portion engaging said actuating member and opening said port as it moves into the first mentioned position, and a relatively movable rear portion adapted to engage the periphery of the body portion of said piston before the latter is engaged by the forward edge of said forward edge portion.

13. In an internal combustion engine of the rotary piston type, the combination with a working cylinder having a normally open exhaust port, of a rotary piston working in said cylinder and comprising a cylindrical body portion of smaller diameter than said cylinder and a projection from said body portion extending into engagement with the peripheral wall of said cylinder and formed with a charge receiving chamber, a valve mechanism controlling communication between said chamber and the cylinder at the rear of said projection, an abutment movable from one position in which it engages the periphery of the body portion of said piston to another position in which it is out of the path of movement of said projection, a reciprocating fuel charge compressing device, and means actuated by said piston for actuating said fuel compressing device to deliver a charge to said chamber, and for opening and closing said valve mechanism, and for giving one complete movement to said abutment, each once for each two revolutions of the piston.

FRANK WALTER.